(12) United States Patent
Yoo

(10) Patent No.: US 11,366,371 B2
(45) Date of Patent: Jun. 21, 2022

(54) SOFTBOX SPEEDRING HAVING FITTING ASSEMBLY STRUCTURE FOR PHOTOGRAPH OR IMAGE, AND SOFTBOX USING THE SAME

(71) Applicant: HYUNDAI FOMEX CO., LTD., Seoul (KR)

(72) Inventor: Jae Kyun Yoo, Seoul (KR)

(73) Assignee: HYUNDAI FOMEX CO., LTD., Seoul (KR)

( * ) Notice: Subject to any disclaimer, the term of this patent is extended or adjusted under 35 U.S.C. 154(b) by 0 days.

(21) Appl. No.: 17/011,314

(22) Filed: Sep. 3, 2020

(65) Prior Publication Data

US 2021/0382374 A1 Dec. 9, 2021

(30) Foreign Application Priority Data

Jun. 9, 2020 (KR) .................. 10-2020-0069624

(51) Int. Cl.
*G03B 15/06* (2021.01)
*F21V 1/06* (2006.01)

(52) U.S. Cl.
CPC ............ *G03B 15/06* (2013.01); *F21V 1/06* (2013.01); *G03B 2215/0525* (2013.01)

(58) Field of Classification Search
CPC ............ G03B 15/06; G03B 2215/0525; G03B 15/0484; G03B 15/0592; F21V 7/18
See application file for complete search history.

(56) References Cited

U.S. PATENT DOCUMENTS

2019/0377242 A1   12/2019   Boerup

FOREIGN PATENT DOCUMENTS

| DE | 10 2017 124 702 A1 | 10/2018 |
|---|---|---|
| KR | 20-0359367 B1 | 8/2004 |
| KR | 20-0395871 B1 | 9/2005 |
| KR | 10-2011-0039739 A | 4/2011 |

(Continued)

OTHER PUBLICATIONS

The extended European search report issued by the European Patent Office dated Feb. 3, 2021, which corresponds to European Patent Application No. 20194040.0-1010 and is related to U.S. Appl. No. 17/011,314.

(Continued)

*Primary Examiner* — Christopher E Mahoney
(74) *Attorney, Agent, or Firm* — Studebaker & Brackett PC

(57) ABSTRACT

A softbox speedring is provided to reduce the manufacturing costs through a simple structure, to be simply repaired, and allow the rapid folding and spreading of a pole shaft. A softbox speedring having a fitting assembly structure includes a speedring body including a central hole formed at a center of the speedring body, a plurality of adaptor inserting holes formed along an outer circumferential surface of the speedring body, and rotational shaft seating grooves formed in first perpendicular surface and second perpendicular surface of each adaptor inserting hole, and an adaptor including a head part including rotational shafts protruding from opposite perpendicular surfaces of the head part to be fitted into and assembled with the rotational shaft seating grooves, and a body part provided at a lower portion of the head part and including a pole inserting part formed in a lower end of the body part.

5 Claims, 18 Drawing Sheets

(56) References Cited

FOREIGN PATENT DOCUMENTS

| | | | |
|---|---|---|---|
| KR | 10-1103592 B1 | | 1/2012 |
| KR | 10-1127458 B1 | | 3/2012 |
| KR | 10-1790925 B1 | | 10/2017 |
| KR | 101794448 B1 | * | 11/2017 |
| KR | 20180061937 A | * | 6/2018 |
| KR | 10-2018-0093677 A | | 8/2018 |
| KR | 10-1981896 B1 | | 5/2019 |
| KR | 10-2116207 B1 | | 5/2020 |
| KR | 20200134916 A | * | 12/2020 |
| WO | WO-2020045725 A1 | * | 3/2020 |

OTHER PUBLICATIONS

An Office Action mailed by the Korean Intellectual Property Office dated Jul. 23, 2021, which corresponds to Korean Patent Application No. 10-2020-0069624 and is related to U.S. Appl. No. 17/011,314.

\* cited by examiner

SOFTBOX SPEEDRING HAVING FITTING ASSEMBLY STRUCTURE FOR PHOTOGRAPH OR IMAGE, AND SOFTBOX USING THE SAME

CROSS-REFERENCE TO RELATED APPLICATIONS

A claim for priority under 35 U.S.C. § 119 is made to Korean Patent Application No. 10-2020-0069624 filed on Jun. 9, 2020 in the Korean Intellectual Property Office, the entire contents of which are hereby incorporated by reference.

BACKGROUND

Embodiments of the inventive concept relate to a softbox speedring used to take a photograph or a moving picture, and a softbox using the same, and more particularly to a softbox speedring which can be implemented in a quadrangle shape, such as a rectangular shape or a square shape, a polygonal shape having 16 angles, or a circular shape depending on a photographing condition or the selection of a worker when being utilized as a reflector in taking the photograph or the moving picture, and can be easily folded and spread, thereby allowing rapid work, and a softbox using the same.

Electronic flash (commonly called a product name such as 'strobo' and 'speed light') and continuous light are lighting equipment widely used to express the texture expression and reproduce accurate color of a subject with a rich amount of light, when taking a photograph of a full body or a half body of a person indoors or a sample photograph or moving picture for various product advertisements.

A lighting scheme through the electronic flash and the continuous light used to obtain an image having an excellent quality when taking the photograph or the moving picture may be mainly classified into a direct lighting scheme, a diffuse lighting scheme, and a reflective lighting scheme.

In detail, the direct lighting scheme is to directly irradiate the subject with light emitted from the electronic flash and the continuous light, and the diffuse lighting scheme is to irradiate the subject with light diffused by a softbox, as the softbox is provided with thin cloth (diffuser) fixed to a periphery of a lamp and a front surface of the lamp using a frame (pole).

In addition, the reflective lighting scheme is to widely irradiate the subject with light by mounting a reflector, which is coated with a reflective material and specially produced in the shape of an umbrella, on a front surface of the electronic flash to reflect emitted light at a wider angle, when a wide irradiation angle is necessary in a narrow space.

In particular, the softbox is manufactured by covering fabric, which is coated with reflective dye or silver foil, having high-quality yarn, which is prepared through the inspection for bursting strength, tensile strength, light transmittance, and friction, on an iron core (pole) while being maintained in the shape of a trumpet having four angles or eight angles or more. Such a softbox has been widely used recently.

For example, Korean Utility Model Registration No. 20-0359367 discloses "Speedring of Softbox". The speedring formed of aluminum or heat-resistant synthetic resin is rapidly detached, is freely rotatable at 360°, and has a lightweight, thereby improving functionality and convenience, which allows a user to carry the speedring like an umbrella.

However, according to the above prior art, the softbox includes a support component in addition to a speedring, ribs, and cloth to reflect light. The softbox has a complex structure as ribs are added as the support component.

Further, the complex structure increases the manufacturing costs and makes it difficult to repair.

In addition, Korean Utility Model Registration No. 20-0395871 discloses "Multiuse speedring of Softbox for Photographing". Such a speedring includes a ring having a circular or polygonal flat panel formed therein with several coupling holes used to fit a tension bar onto the circumference of the flat panel, and the shapes of several types of softboxes are marked on one perpendicular surfaces to rapidly help the utilizing of the coupling holes.

However, according to the prior art, several coupling holes are formed in an outer circumferential surface of the speedring, and tension bars are inserted into the several coupling holes in a vertical direction, thereby assembling the softbox. Such an assembling method requires a large amount of force, so the assembling may be difficult depending on a physical ability of a worker.

In more detail, when the softbox is assembled in the form of a flat panel, the tension bar may be easily inserted into and engaged with the coupling hole formed in the speedring to assemble the softbox. However, since the softbox performs a function of diffusing light emitted from lighting equipment to irradiate a subject with softer light, the softbox requires a structure, for example, the structure of a disk, to reflect the emitted light toward the subject.

Accordingly, when the softbox is assembled in a specific spherical shape or curved-line shape, inserting the tension bar into the coupling hole, which is formed in the speedring, in the vertical direction is significantly difficult. In other words, although inserting three tension bars into the coupling holes in the speedring is not difficult when four tension bars are provided, engaging the last tension bar with the coupling hole in the vertical direction is significantly difficult.

Accordingly, there is necessary to develop a softbox to be more simply assembled by easily inserting a tension bar into a coupling hole formed in a speedring while minimizing the interference of soft light irradiated on a subject through the softbox.

SUMMARY

Embodiments of the inventive concept provide a speedring for a softbox, capable of reducing manufacturing costs through a simple structure, being simply repaired, and allowing rapid folding and spreading of a pole shaft.

Embodiments of the inventive concept provide a softbox which can be utilized as a reflector when taking a photograph or a moving picture, allows self-repair even if a part is broken, and can provide excellent operability for carrying and storage.

According to an exemplary embodiment, there is provided a softbox speedring having a fitting assembly structure, which includes a speedring body including a central hole formed at a center of the speedring body, a plurality of adaptor inserting holes formed along an outer circumferential surface of the speedring body, and rotational shaft seating grooves formed in first perpendicular surface and second perpendicular surface of each adaptor inserting hole, and an adaptor including a head part including rotational shafts protruding from opposite perpendicular surfaces of the head part to be fitted into and assembled with the rotational shaft seating grooves, and a body part provided at a lower portion of the head part and including a pole inserting part formed in a lower end of the body part.

According to an exemplary embodiment, there is provided a softbox including a speedring including a speeding body including a central hole formed at a center of the speedring body, a plurality of adaptor inserting holes formed along an outer circumferential surface of the speedring body, and rotational shaft seating grooves formed in first perpendicular surface and second perpendicular surface of each adaptor inserting hole, and an adaptor having a head part including rotational shafts protruding from the opposite perpendicular surfaces to be fitted into and assembled with the rotational shaft seating grooves and a body part formed at a lower portion of the head part and having a pole inserting part formed at a lower end of the body part, a pole having one end inserted into the pole inserting part to link to pivoting of the adaptor, and reflective cloth coupled to the pole and the speedring to reflect light.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
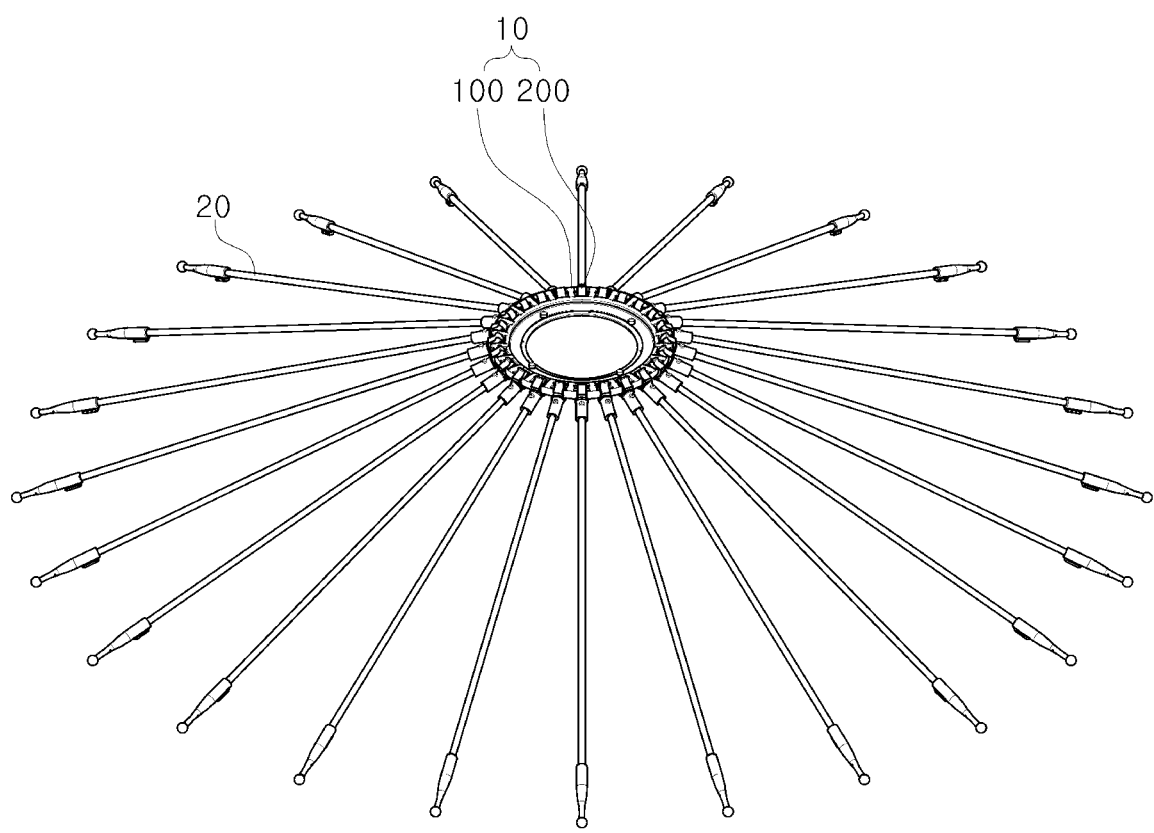
FIG. 1 is a perspective view illustrating a softbox speedring spread, according to the inventive concept.

Advantage points and features of the inventive concept and a method of accomplishing thereof will become apparent from the following description with reference to the following figures, wherein embodiments will be described in detail with reference to the accompanying drawings. However, the inventive concept may be embodied in various different forms, and should not be construed as being limited only to the illustrated embodiments. Rather, these embodiments are provided as examples so that this disclosure will be thorough and complete, and will fully convey the inventive concept to those skilled in the art. The inventive concept may be defined by scope of the claims.

The terminology used in the inventive concept is provided for the illustrative purpose, but the inventive concept is not limited thereto. As used herein, the singular terms "a," "an" and "the" are intended to include the plural forms as well, unless the context clearly indicates otherwise. Furthermore, it will be further understood that the terms "comprises", "comprising," "includes" and/or "including", when used herein, specify the presence of stated elements, steps, operations, and/or devices, but do not preclude the presence or addition of one or more other components, steps, operations and/or devices. The same reference numerals will be assigned to the same component throughout the whole specification, and the term "and/or" refers to that components described include not only individual components, but at least one combination of the components. It will be understood that, although the terms "first", "second", etc., may be used herein to describe various components, these components should not be limited by these terms. These terms are only used to distinguish one component from another component. Thus, a first component to be described below may be a second component without departing from the teachings of the inventive concept.

Unless otherwise defined, all terms (including technical and scientific terms) used herein have the same meaning as commonly understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Spatially relative terms, such as "below", "beneath", "lower", "above", "upper", and the like, may be used herein to make it easier to describe the relationship between one component and another component. It will be understood that the spatially relative terms are intended to encompass different orientations of components in use or operation in addition to the orientation depicted in the drawings. For example, when a component illustrated in accompanying drawings is reversed, a component provided 'below' or 'beneath' another component may be placed 'above' another component. Accordingly, the exemplary term "below" may include both concepts of "below" and "above. A component may be oriented in a different direction. Accordingly, terminology having relatively spatial concepts may be variously interpreted depending on orientations.

Figure 2:
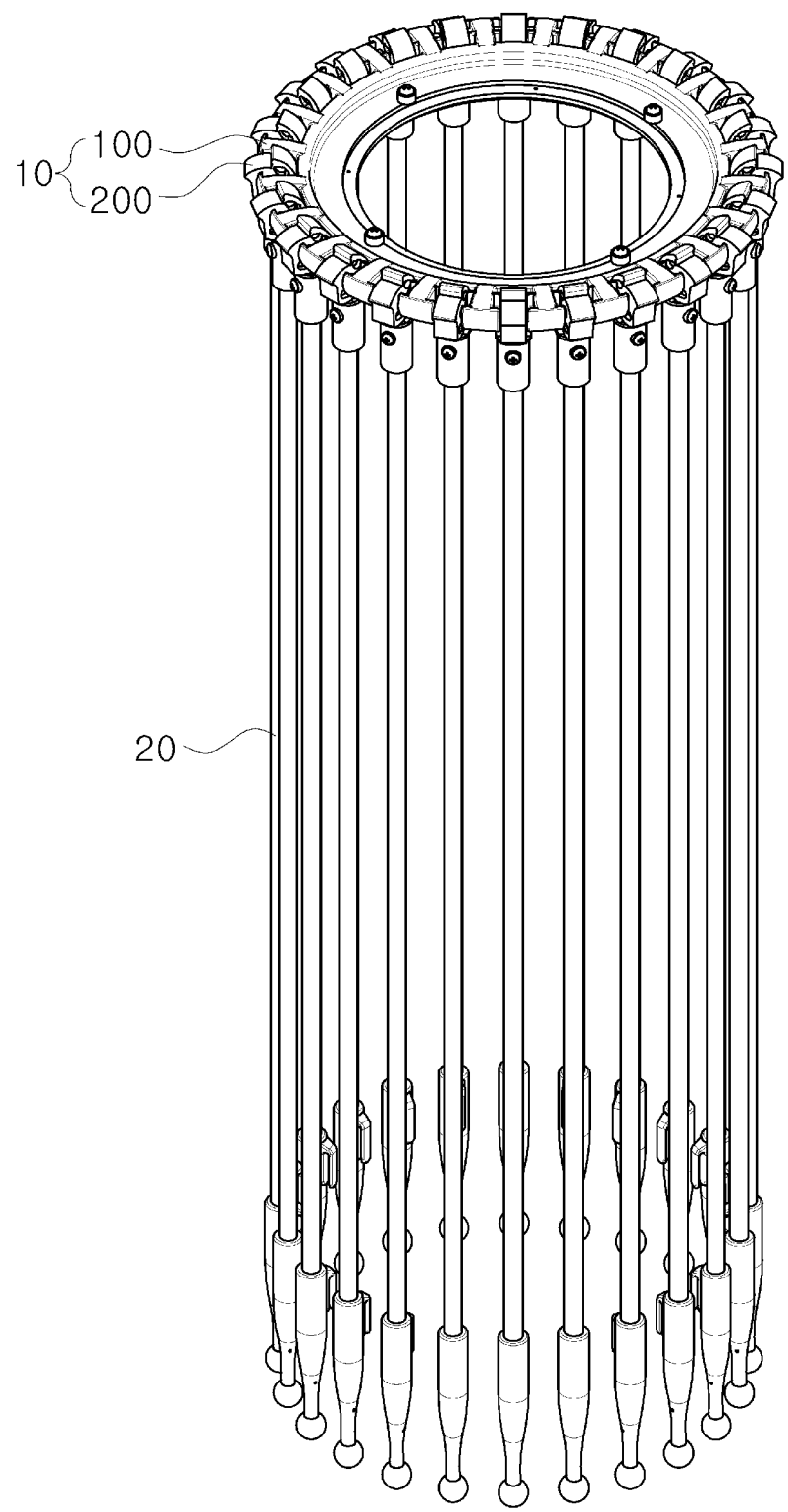
FIG. 2 is a perspective view illustrating a softbox speedring folded, according to the inventive concept.

Hereafter, a softbox speedring (hereinafter, simply referred to as "softbox speedring") having a fitting assembly structure will be described in detail according to an exemplary embodiment of the inventive concept FIG. 1 is a perspective view illustrating a softbox speedring spread, according to the inventive concept, and FIG. 2 is a perspective view illustrating a softbox speedring folded, according to the inventive concept.

Referring to FIGS. 1 and 2, according to the inventive concept, a softbox speedring 10 includes a speedring body 100 having a plurality of adaptor inserting holes 120 formed along an outer circumference thereof and an adaptor 200 having one end fitted into the adaptor inserting hole 120 for assembling, and another end opposite to the one end, a pole inserting part 222 being provided at the another end.

Hereinafter, the details of the softbox speedring 10 will be described in terms of components thereof with respect to accompanying drawings.

Figure 3:
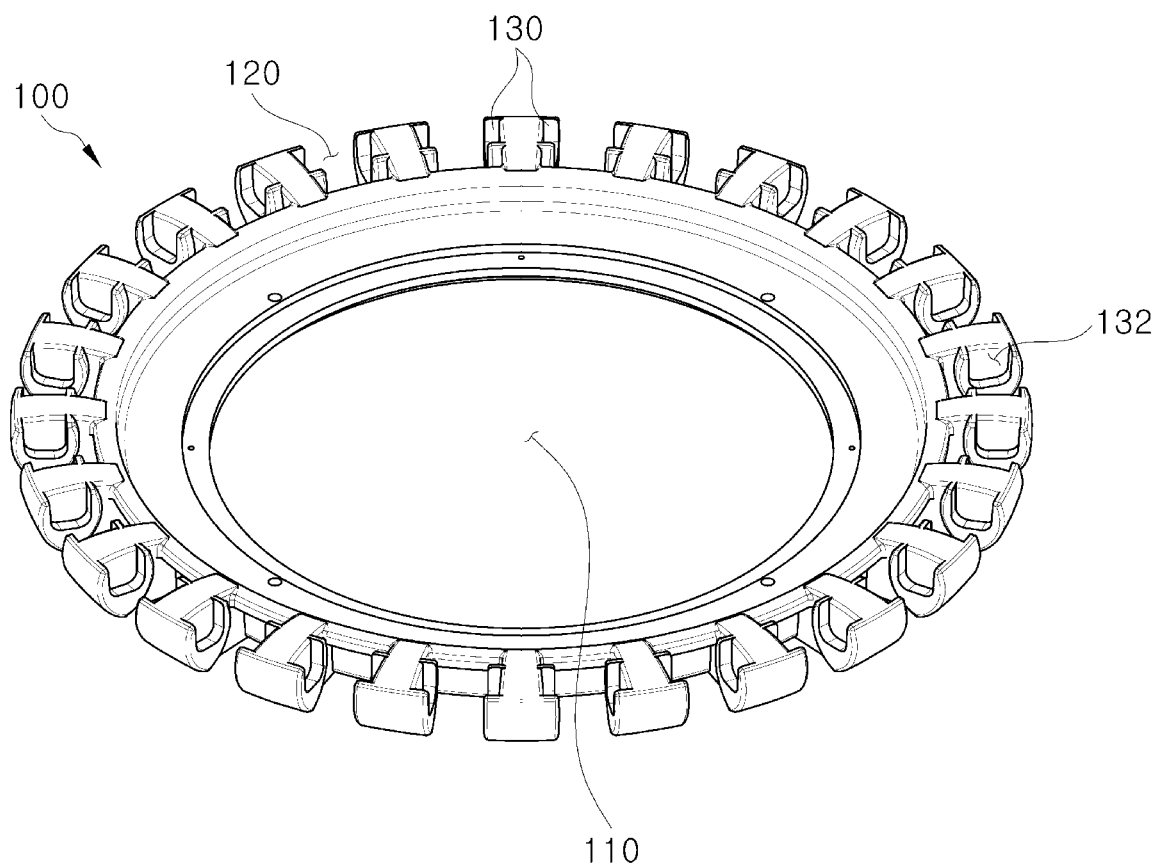
FIG. 3 is a perspective illustrating a speedring body, according to the inventive concept.

FIG. 3 is a perspective illustrating a speedring body, according to the inventive concept.

Referring to FIGS. 1 to 3, according to the inventive concept, the softbox speedring 10 includes the speedring body 100.

The speedring body 100, which is to provide a space for place reflective cloth and a pole 20, includes a central hole 110, which is to provide a mounting space for a lighting unit or a boom stand, formed at the center thereof, and the plurality of adaptor inserting holes 120 formed along the outer circumference thereof to assemble the adaptor 200 and to connect the pole 20.

In addition, the speedring body 100 may be formed in a polygonal structure having various angles, for example, six angles, eight angles, ten angles, or fifteen angles, or in a circular structure.

In addition, the speedring body 100 may formed of a material, such as aluminum or heat-resistant synthetic resin, to be prevented from being damaged by heat transmitted from a light emitting lamp.

The central hole 110 may have various structures as long as the central hole 110 provides the mounting space for the lighting unit or the boom stand. It is preferred that the central hole 110 has a circular structure as illustrated in FIG. 3.

The adaptor inserting holes 120 are formed on the outer circumferential surface of the speedring body 100 at regular intervals, and are formed in a block structure, such as a rectangular parallelepiped, such that the adaptor 200 having the block structure is assembled with the adaptor inserting hole 120. Accordingly, the speedring body 100 may include an inner surface adjacent to the central hole 110 and a pair of perpendicular surfaces formed in a direction perpendicular to opposite ends of the inner surface, with respect to each adaptor inserting hole 120.

In addition, each adaptor inserting hole 120 may include rotational shaft seating grooves 132, which are formed in opposite perpendicular surfaces thereof, preferably, a pair perpendicular surfaces (a first perpendicular surface and a second perpendicular surface), to assemble the adaptor 200.

According to a specific aspect of the inventive concept, the speedring body 100 may include a pair of adaptor mounting members 130 with respect to each adaptor inserting hole 120. The adaptor mounting members 130 are provided on the first perpendicular surface and the second perpendicular surface of each adaptor inserting hole 120, respectively, as illustrated in FIG. 3. In addition, the adaptor mounting member 130, which is formed in the structure of the disk, includes the rotational shaft seating groove 132 formed at the center thereof and a rotational shaft introducing port which is formed in an upper portion thereof to be open to communicate with the rotational shaft seating groove 132.

The rotational shaft seating groove 132 and the rotational shaft introducing port form a 'U'-shaped groove allowing a rotational shaft of the adaptor 200 to pivot in the state that the rotational shaft of the adaptor 200 is assembled with the adaptor mounting member 130.

In other words, a first adaptor mounting member 130 is provided on the first perpendicular surface of each adaptor inserting hole 120, and a second adaptor mounting member 130 is provided on the second vertical surface of the adaptor inserting hole 120.

If necessary, a lamp fixing part may be detachably mounted on an edge of a bottom surface of the speedring body 100 to fix a light emitting lamp.

Figure 4:
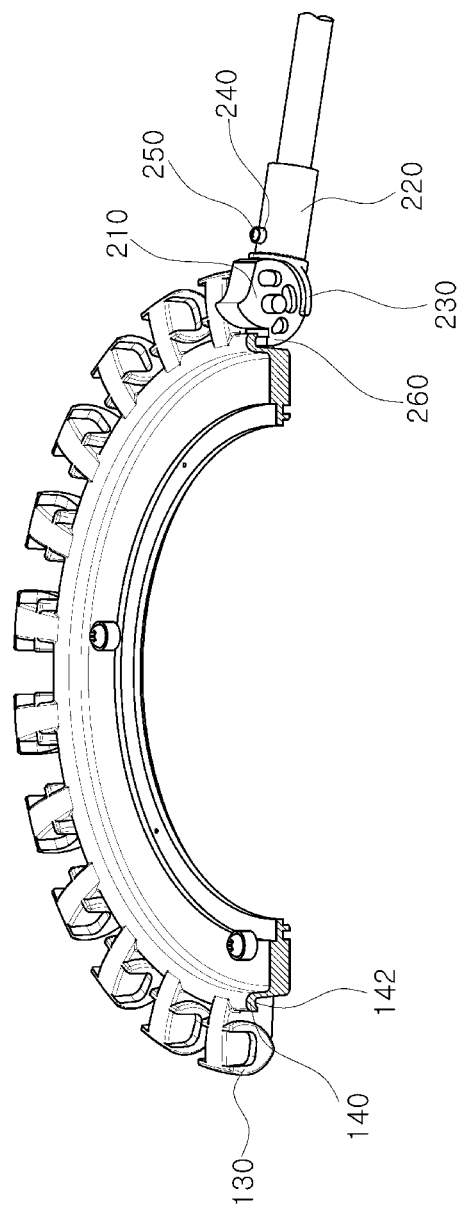
FIG. 4 is a sectional surface illustrating a speedring, according to another embodiment of the inventive concept.

FIG. 4 is a sectional surface illustrating a speedring, according to another embodiment of the inventive concept. Referring to FIG. 4, according to the inventive concept, the speedring body 100 may include a spread supporting member 140 protruding from the inner surface, which connects the first perpendicular surface to the second perpendicular surface of each adaptor inserting hole 120, of the adaptor inserting hole 120

The spread supporting member 140 blocks the pivoting path of the adaptor 200 such that the adaptor 200 assembled with the speedring body 100 is prevented from pivoting about first rotational shaft 212 and second rotational shaft 214 at a specific position.

According to a specific aspect of the inventive concept, the spread supporting member 140 may be formed at a lower portion thereof with a spread maintaining groove 142. The spread maintaining groove 142 provides a space for insert a portion of the adaptor 200, which makes close contact with the spread supporting member 140, into the spread maintaining groove 142. In addition, when the portion of the adaptor 200 is inserted into the spread maintaining groove 142, the adaptor 200 is blocked from pivoting such that the adaptor 200 is prevented from pivoting about the rotational shaft even if the adaptor 200 is shaken by external force. In addition, when the portion of the adaptor 200 is inserted into the spread maintaining groove 142, the adaptor 200 is prevented from deviating from the spread supporting member 140 even if external force of drawing the adaptor 200 occurs in a direction opposite to the central hole 100.

Figure 5:
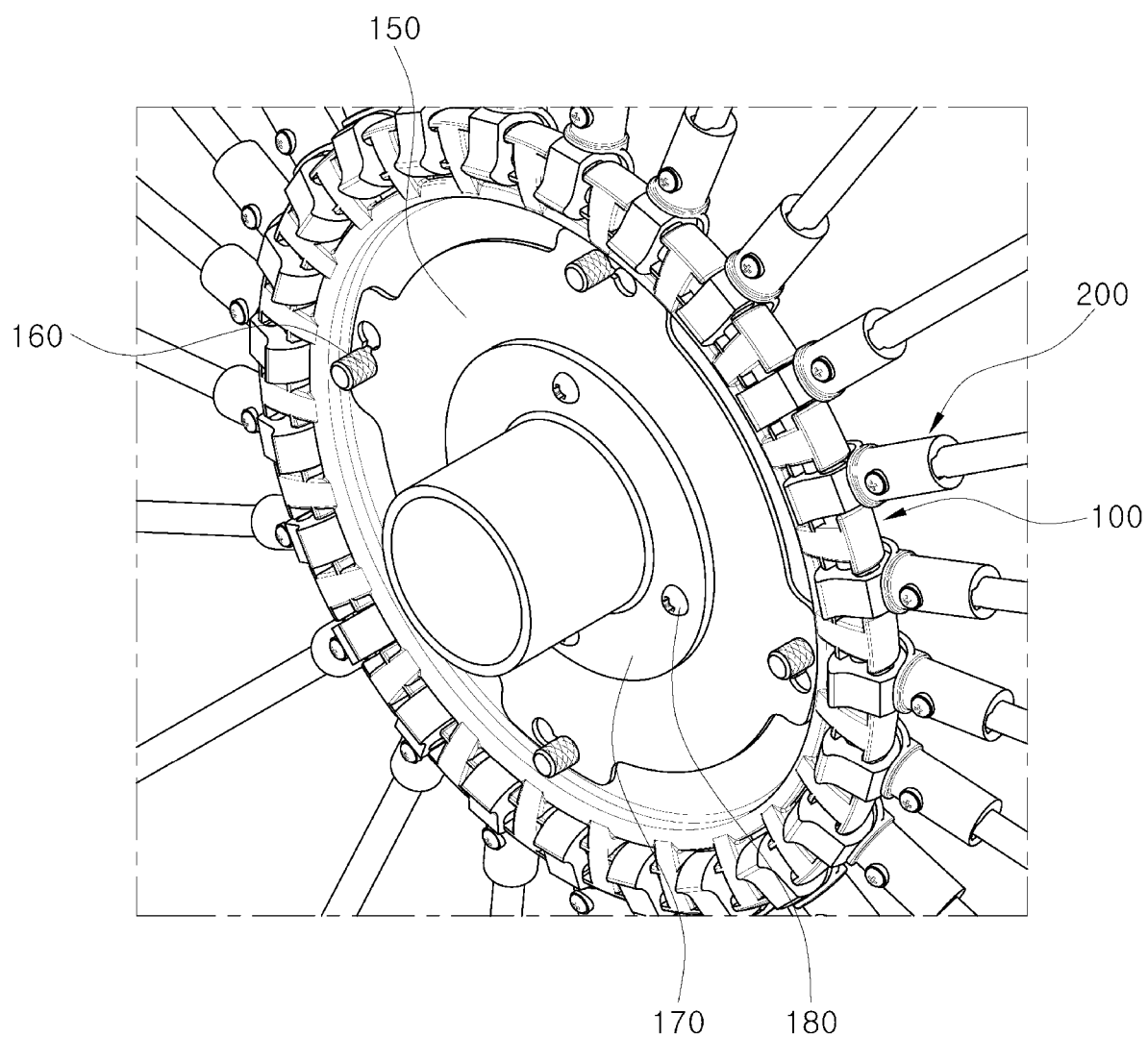
FIG. 5 is a partially enlarged perspective view illustrating a bottom surface of a speedring, according to the inventive concept.

FIG. 5 is a partially enlarged perspective view illustrating a bottom surface of a speedring, according to the inventive concept. Referring to FIG. 5, according to the inventive concept, the speedring 10 may include a central hole cover 150 to close the central hole 110 to prevent light, which is emitted from the light emitting lamp, from leaking to the rear portion of the speedring 10.

The central hole cover 150 is formed in a disk structure to cover the central hole 110. In addition, the central hole cover 150 may be provided at the central portion thereof with a lighting unit inserting hole formed in a circular shape, a rectangular shape, or a triangular shape.

The central hole cover 150 may include a plurality of main holes provided along the edge thereof. In addition, the central hole cover 150 may include an auxiliary hole formed in at a side surface of each main hole to communicate with the main hole, and having an inner diameter smaller than that of the main hole.

In addition, according to the inventive concept, the speedring 10 may include a plurality of first assembling units 160 formed along the edge of the central hole 110 in the speedring body 100. The first assembling unit 160, which is to provide a space for seating the central hole cover 150 on the bottom surface of the speedring body 100, may include an assembling bolt having a head part having an outer diameter greater than that of a body part thereof.

The body part of the first assembling unit 160 may be formed to have an outer diameter corresponding to the inner diameter of the auxiliary hole, and the head part may be formed to have the outer diameter corresponding to the main hole. This is necessary to assemble the central hole cover 150 with the bottom surface of the speedring body 100, in the procedure of bring the central hole cover 150 close contact with the bottom surface of the speedring body 100 so as to insert the first assembling unit 160 assembled with the bottom surface of the speedring body 100 into the main hole of the central hole cover 150, and of rotating the central hole cover 150 so as to insert the body part of the first assembling unit 160 into the auxiliary hole of the central hole cover 150.

In other words, the central hole cover 150 has a plurality of main holes and a plurality of auxiliary holes. Accordingly, the central hole cover 150 is detachably attached to the speedring body 100 according to a user selection without separating the first assembling unit 160, which is assembled with the speedring body 100, from the speedring body 100.

In addition, according to the inventive concept, the speedring 10 may include a connection socket 170 having a lighting unit fixing member communicating with a lighting unit introducing hole in the central hole cover 150. The connection socket 170 includes a lighting unit fixing member having a tubular structure, and a flange part provided at an end of the lighting unit fixing member. In this case, the flange part makes contact with the central hole cover 150, and has a plurality of assembling holes formed along an edge thereof.

The lighting unit fixing member provides an insertion space such that a portion of the lighting unit or a portion of the boom stand is stably inserted into the connection socket 170 and supported.

According to the inventive concept, the speedring 10 may include a second assembling unit 180 inserted into the assembling hole to couple the connection socket 170 to the central hole cover 150. The second assembling unit 180 may perform a function of fixing the connection socket 170 to the central hole cover 150 to prevent the connection socket 170 from being separated from a rear surface or a front surface of the central hole cover 150.

Figure 6:
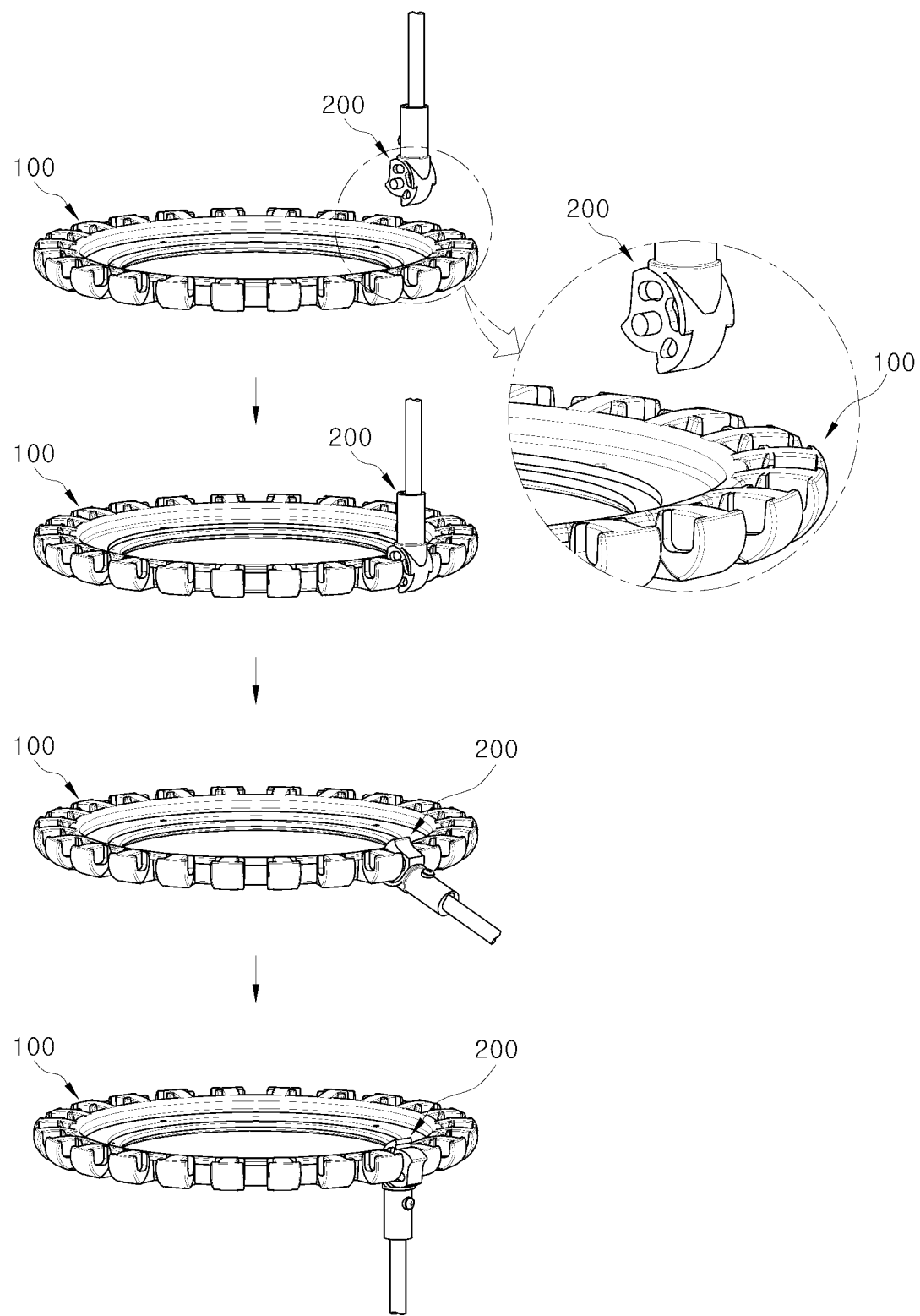
FIG. 6 is a view sequentially illustrating movement of an adaptor assembled with a speedring body.
Figure 7:
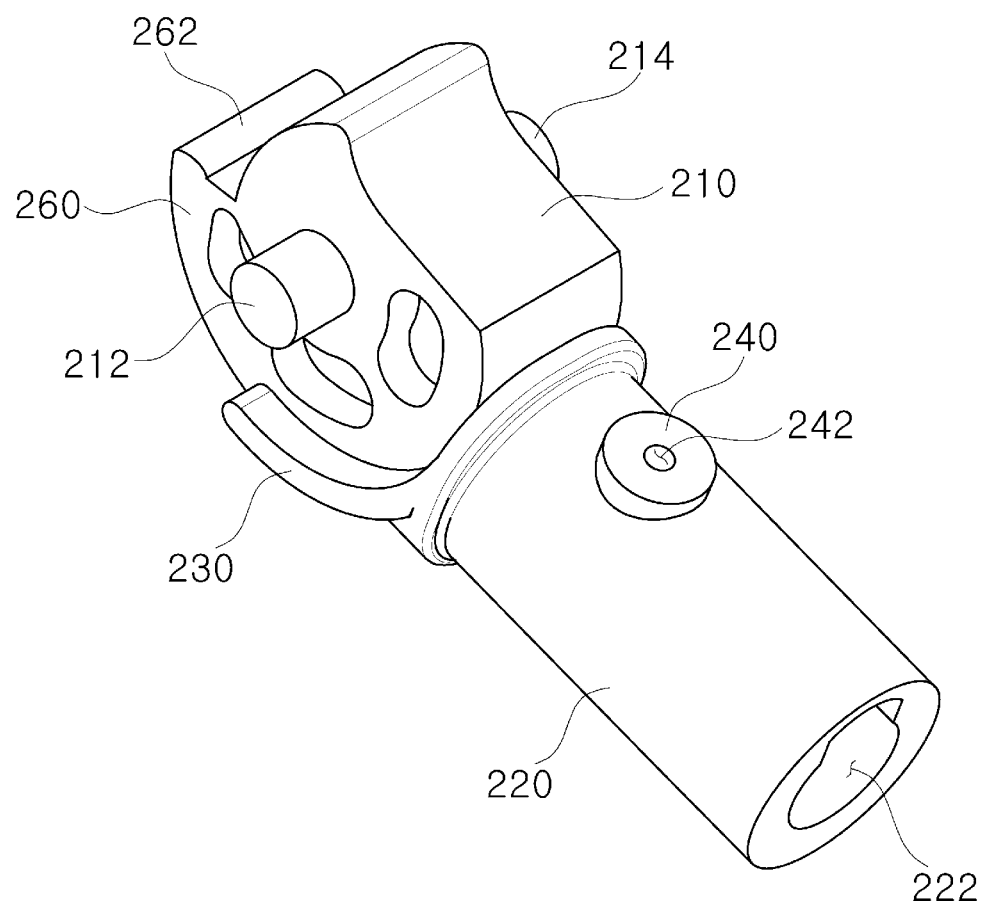
FIGS. 7 and 8 are perspective views illustrating an adaptor, according to the inventive concept.
Figure 8:
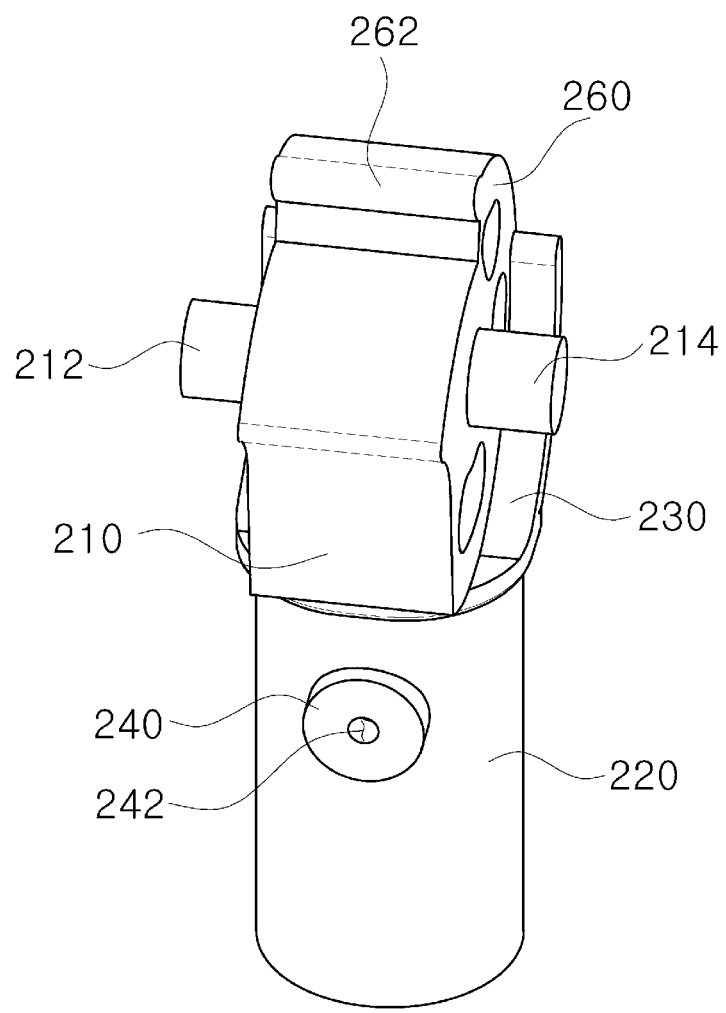

FIG. 6 is a view sequentially illustrating movement of an adaptor assembled with a speedring body, and FIGS. 7 and 8 are perspective view illustrating an adaptor, according to the inventive concept.

Referring to FIGS. 1 and 7, according to the inventive concept, the softbox speedring 10 includes the adaptor 200.

The adaptor 200, which is interposed between the speedring body 100 and the pole 20 to couple the pole 20 to the speedring body 100, is configured to pivot, as the adaptor 200 is fitted into the adaptor inserting hole 120 of the speedring body 100 and assemble with the speedring body 100.

In detail, the adaptor 200 includes a head part 210 and a body part 220 as illustrated in FIGS. 7 and 8, and may further include, optionally, a locking plate 230, a bolt fixing port 240, a coupling bolt 250, and a locking step 260.

The head part 210, which is fitted into and assembled with the speedring body 100, includes rotational shafts, which are to be fitted into and assembled with the rotational shaft seating grooves 132, protruding opposite perpendicular surfaces thereof. To this end, the head part 210 is formed to have a length corresponding to the length of the adaptor inserting hole 120, and has a width corresponding to the width of the adaptor inserting hole 120.

In other words, the head part 210 includes a first rotational shaft 212 protruding in a direction of facing the first perpendicular surface of the adaptor inserting hole 120 and a second rotational shaft 214 protruding in a direction of facing the second perpendicular surface of the adaptor inserting hole 120. In this case, the first rotational shaft 212 and the second rotational shaft 214 may be formed in a cylindrical shape to be pivotable in the state that the first rotational shaft 212 and the second rotational shaft 214 are fitted into and assembled with the rotational shaft seating grooves 132.

If necessary, the head part 210 may include a plurality of recesses formed in the first surface thereof facing the first perpendicular surface of the adaptor inserting hole 120 and a plurality of recesses formed in the second surface thereof facing the second pattern correcting coefficient of the adaptor inserting hole 120, such that the material costs are saved.

The body part 220 is provided at the lower portion of the head part 210, and a pole inserting part 222 is formed in an end of the body part 20 such that an end of the pole 20 is inserted into the pole insertion part 222. In this case, the pole inserting part 222 is formed to have an inner diameter corresponding to an outer diameter of the pole 20.

The locking plate 230, which protrudes from the edge of the head part 210 to prevent the adaptor 200 from deviating from the upper portion of the speedring body 100, restricts the adaptor 200 from moving in an up-down direction or in a front-rear direction to prevent the adaptor 200 from deviating from the speedring body 100 by the external force in the state that the adaptor 200 is fitted into and assembled with the speedring body 100, as illustrated in FIGS. 7 and 8.

In detail, the locking plate 230 has a cut-out structure having the range of ⅓ to ⅕ of circumferences formed about the first rotational shaft 212 and the second rotational shaft 214 as illustrated in FIGS. 7 and 8.

In addition, the circumference is formed to have an inner diameter corresponding to the outer diameter of the adaptor mounting member 130 divided into two parts in an up-down direction. In other words, when positioned on a first adaptor mounting member, which is adjacent to the central hole 110, of the adaptor mounting member divided into two parts, the locking plate 230 is formed to have an inner diameter corresponding to an outer diameter of the first adaptor mounting member. When positioned on a second adaptor mounting member constituting the adaptor mounting member 130 together with the first adaptor mounting member, the locking plate 230 is formed to have an inner diameter corresponding to an outer diameter of the second adaptor mounting member.

Figure 9:
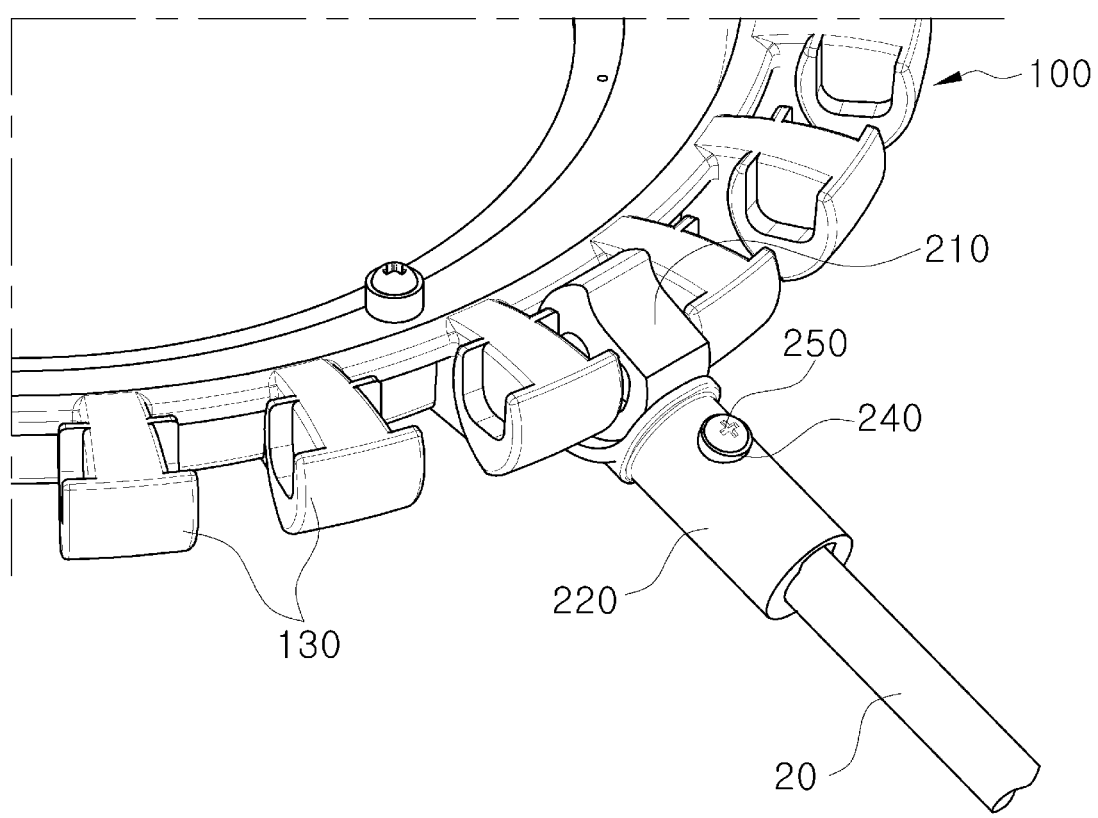
FIGS. 9 to 11 are view illustrating the structure of an adaptor pivoting in the state that the adaptor is coupled to a speedring body.
Figure 10:
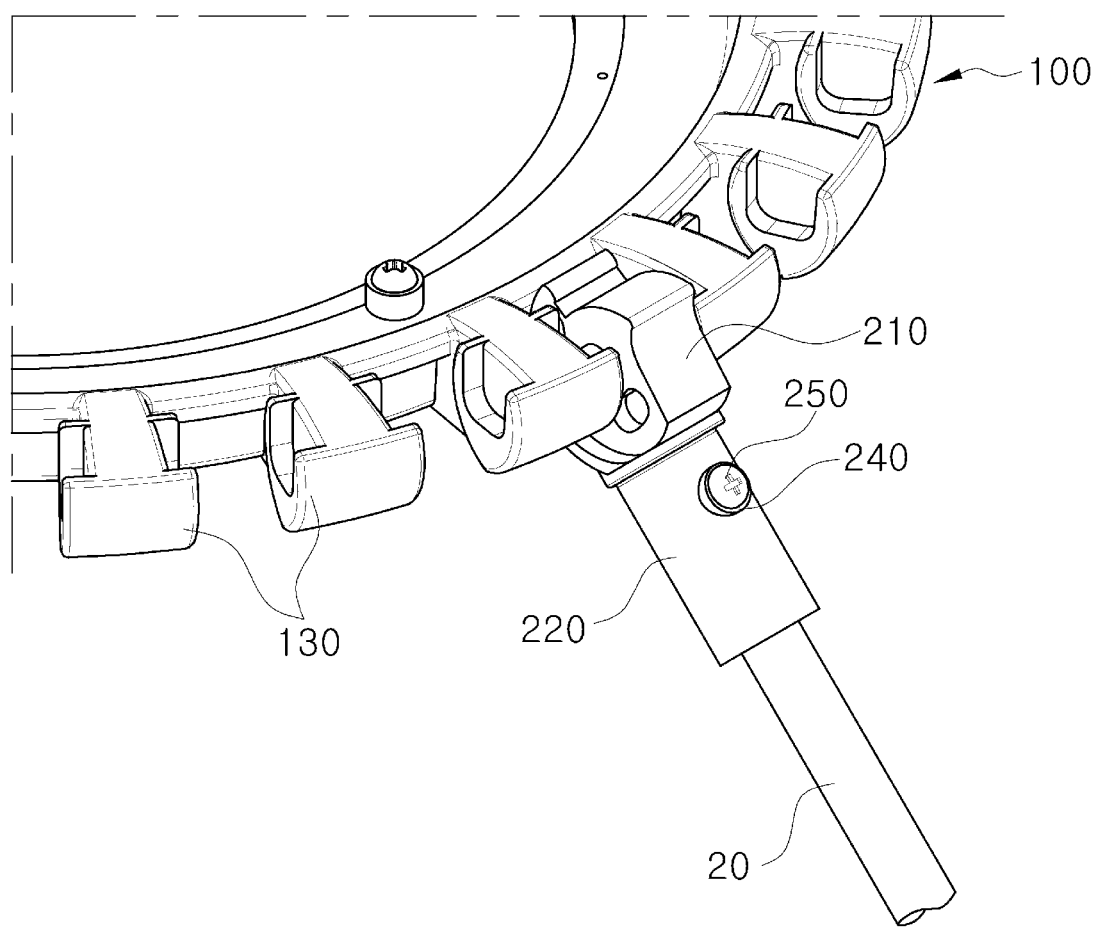
Figure 11:
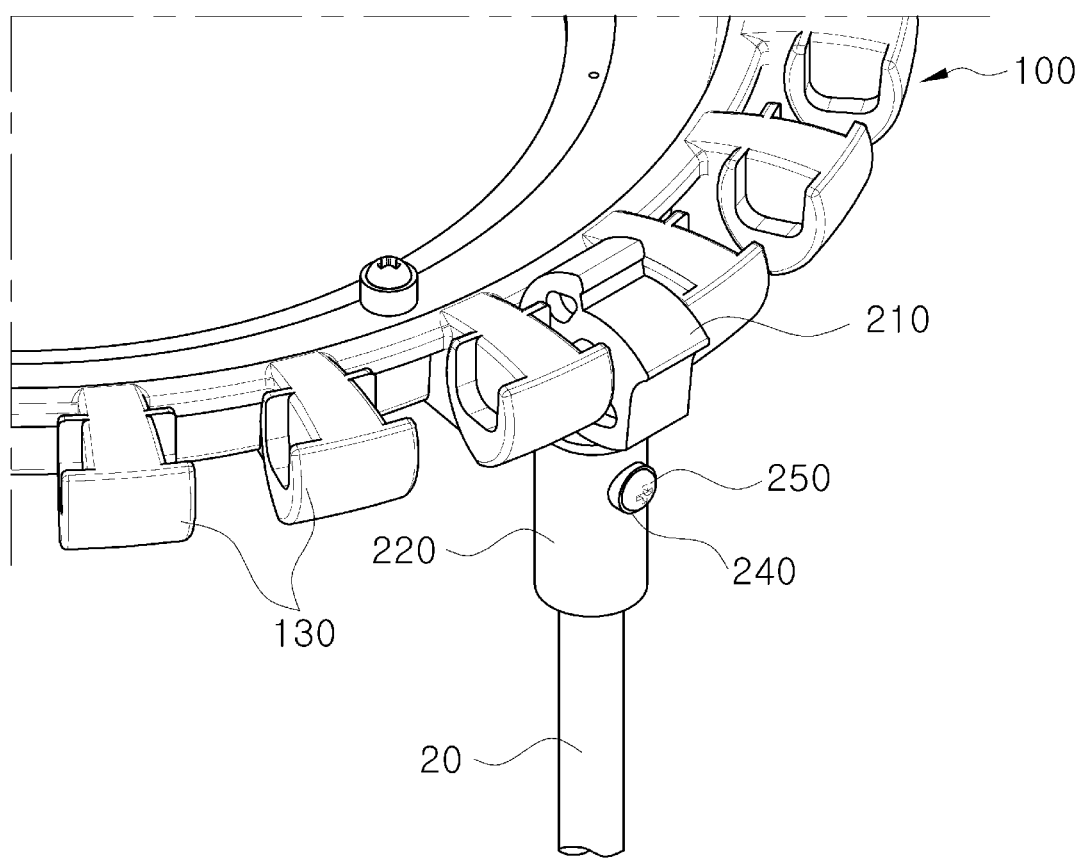

FIGS. 9 to 11 are view illustrating the structure of an adaptor pivoting in the state that the adaptor is coupled to a speedring body.

To couple the adaptor 200 having the locking plate 230 to the speedring body 100, the adaptor 200 is first introduced into the top surface, which faces the rotational shaft seating groove 132 and the rotational shaft introducing port, of the speedring body 100 as illustrated in FIG. 6. This is because the locking plate 230 is positioned in an upper portion of the adaptor mounting member 130, so the first rotational shaft 212 and the second rotational shaft 214 of the adaptor 200 are inserted into the adaptor inserting hole 120.

Then, the adaptor 200 having the locking plate 230 is allowed to pivot such that the pole 20 maintains horizontal to the speedring body 100 as illustrated in FIGS. 6 and 9. As described above, when the pole 20 maintains horizontal to the speedring body 100, the softbox is spread. In this case, since the locking plate 230 is positioned under the adaptor mounting member 130 as illustrated in FIGS. 3 and 9, the adaptor 200 is prevented from being separated from the speedring body 100 even if force is applied to the adaptor 200 in the up-down direction or front-rear direction.

Thereafter, the adaptor 200 having the locking plate 200 is allowed to pivot as illustrated in FIGS. 6 and 10 such that the pole 20 maintains an interior angle to be in the range of 120° to 150° with respect to the speedring body 100. As described above, when the pole 20 maintains the interior angle to be in the range of 120° to 150° with respect to the speedring body 100, the softbox is partially spread. In this case, since the locking plate 230 is positioned under the first adaptor mounting member and the second adaptor mounting member as illustrated in FIGS. 6 and 10, the adaptor 200 is prevented from being separated from the speedring body 100 even if force is applied to the adaptor 200 in the up-down direction or front-rear direction.

Finally, the adaptor 200 having the locking plate 200 is allowed to pivot as illustrated in FIGS. 6 and 11 such that the pole 20 maintains the interior angle of 90° with respect to the speedring body 100. As described above, when the pole 20 maintains the interior angle of 90° with respect to the speedring body 100, the softbox is folded. In this case, since the locking plate 230 is positioned under the first adaptor mounting member 130 as illustrated in FIGS. 6 and 11, the adaptor 200 is prevented from be separated from the speedring body 100 even if force is applied to the adaptor 200 in the up-down direction or front-rear direction.

In other words, to separate the adaptor 200 having the locking plate 230 from the speedring body 100, the adaptor 200 should pivot upward from the speedring body 100 to prevent the adaptor 200 from making contact with the adaptor mounting member 130. In other words, to separate the adaptor 200 from the speedring body 100, the adaptor 200 not only should form the interior angle of 90° with respect to the speedring body 100, but also should pivot such that the end of the adaptor 200 is positioned above the speedring body 100.

The coupling bolt 250 provides fixing force to the pole 20 such that the pole 20 assembled with the body part 220 of the adaptor 200 is stably maintained assembled, and is inserted into the perpendicular surface of the body part 220 to make contact with the pole 20 inserted into the body part 220.

The bolt fixing port 240, which is to provide an assembling space of the coupling bolt 250 such that the coupling bolt 250 is stably assembled with the body part 220, is provided on the perpendicular surface of the body part 220. In this case, a coupling hole 242 is formed in the bolt fixing port 240 in a longitudinal direction of the bolt fixing port 240 to assemble the coupling bolt 250.

The locking step 260 is provided at an upper portion of the head part 210. When the head part 210 is allowed to pivot about the first rotational shaft 212 and the second rotational shaft 214, the locking step 260 makes contact with the spread supporting member 140 to stop the pivoting of the adaptor 200. To this end, the locking step 260 is formed in a stepped structure at the upper portion the head part 210.

In this case, the rotational shaft seating groove 132 may be formed to have a width allowing the locking step 260 to selectively make contact with the spread supporting member 140 as the first rotational shaft 212 and the second rotational shaft 214 move inside the rotational shaft seating groove 132.

This is because the contact of the locking step 260 to the spread supporting member 140 is determined depending on the positions of the first rotational shaft 212 and the second rotational shaft 214 inserted into the rotational shaft seating grooves 132, when the adaptor 200 pivots in the state that the adaptor 200 is assembled with the speedring body 100.

If necessary, an inserting protrusion 262 may be formed on the locking step 260 as illustrated in FIGS. 7 and 8. The inserting protrusion 262 is provided on the surface, which faces the spread maintaining groove 142, of the locking step 260 and is inserted into the spread maintaining groove 14, to restrict the adaptor 200, which is assembled with the speedring body 100, from moving in the front-rear direction.

When the adaptor 200 is assembled with the speedring body 100 to insert the inserting protrusion 262 into the spread maintaining groove 142, the adaptor 200 is maintained stably assembled with the speedring body 100 even if drawing force is applied to the adaptor 200.

FIGS. 12 to 16 are schematic views illustrating a method for manipulating a softbox speedring, according to the inventive concept.

Figure 12:
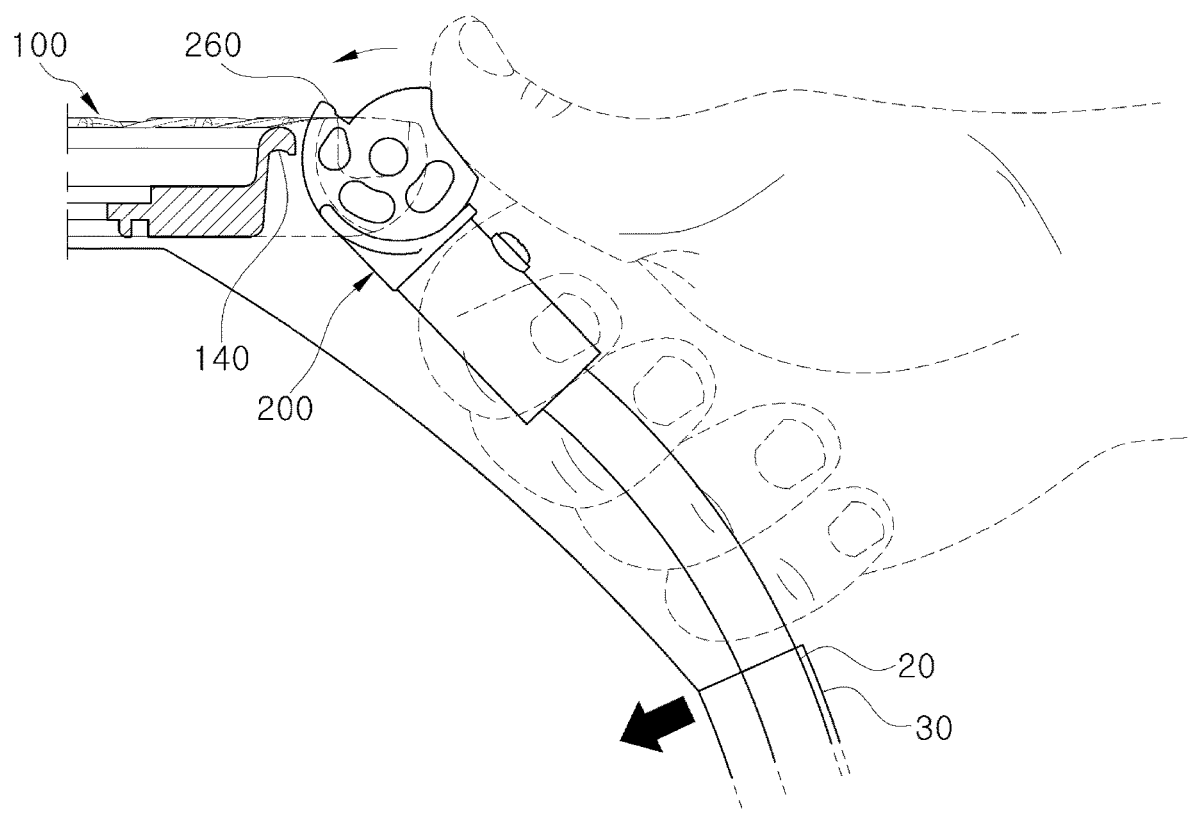
FIGS. 12 to 16 are schematic views illustrating a method for manipulating a softbox speedring, according to the inventive concept.

Regarding a method for manipulating the speedring when the softbox is spread, a user grasps the adaptor 200 and presses the adaptor 200 with a thumb of the user as illustrated in FIG. 12 while moving the first rotational shaft 212 and the second rotational shaft 214 to the right side of the rotational shaft seating grooves 132 to pivot the adaptor 200 counterclockwise. In this case, the right side of the rotational shaft seating groove 132 is positioned in a direction of being away from the central hole 110, and the left side of the rotational shaft seating groove 132 is positioned in a direction of being closer to the central hole 110.

Figure 13:
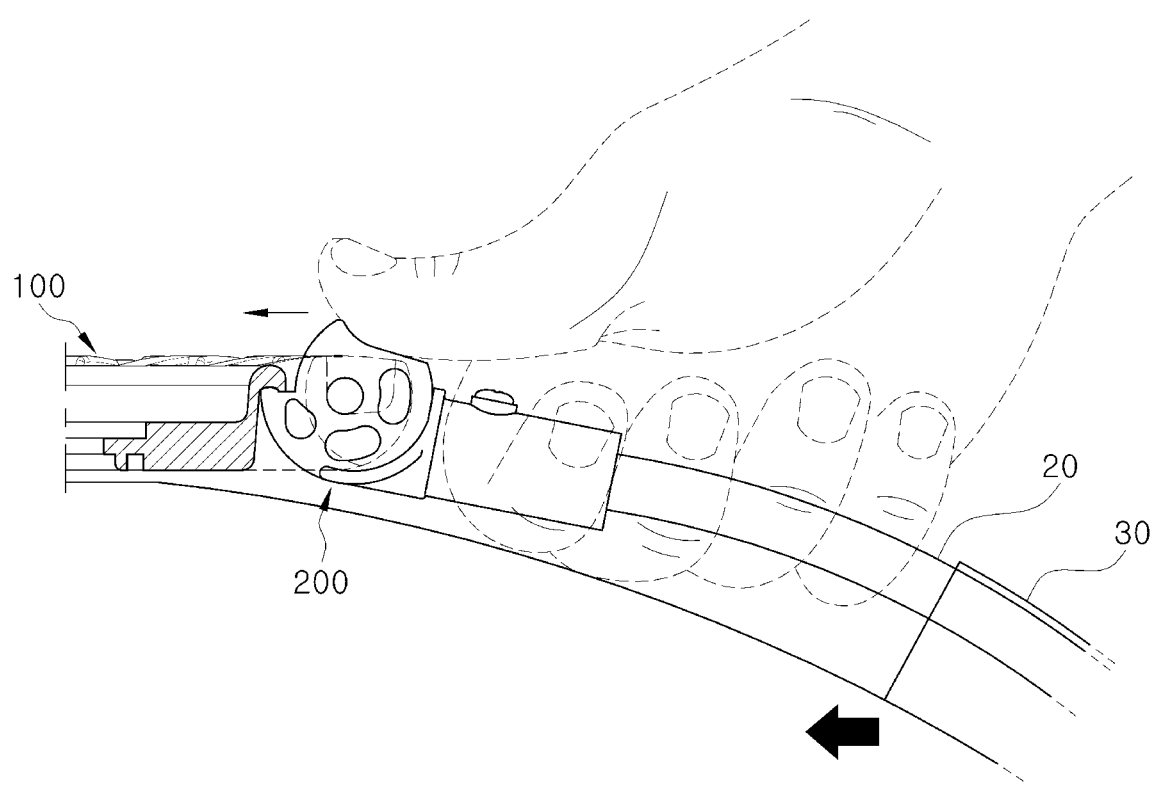

Next, as illustrated in FIG. 13, the user presses the adaptor 200 while moving the first rotational shaft 212 and the second rotational shaft 214 to the left side of the rotational shaft seating groove 132 and pivot the adaptor 200 clockwise, thereby moving the first rotational shaft 212 and the second rotational shaft 214 to the left side of the rotational shaft seating groove 132.

As described above, when the softbox is spread, the tension of the pole 20 and the reflective cloth 30 face the central portion of the softbox.

Figure 14:
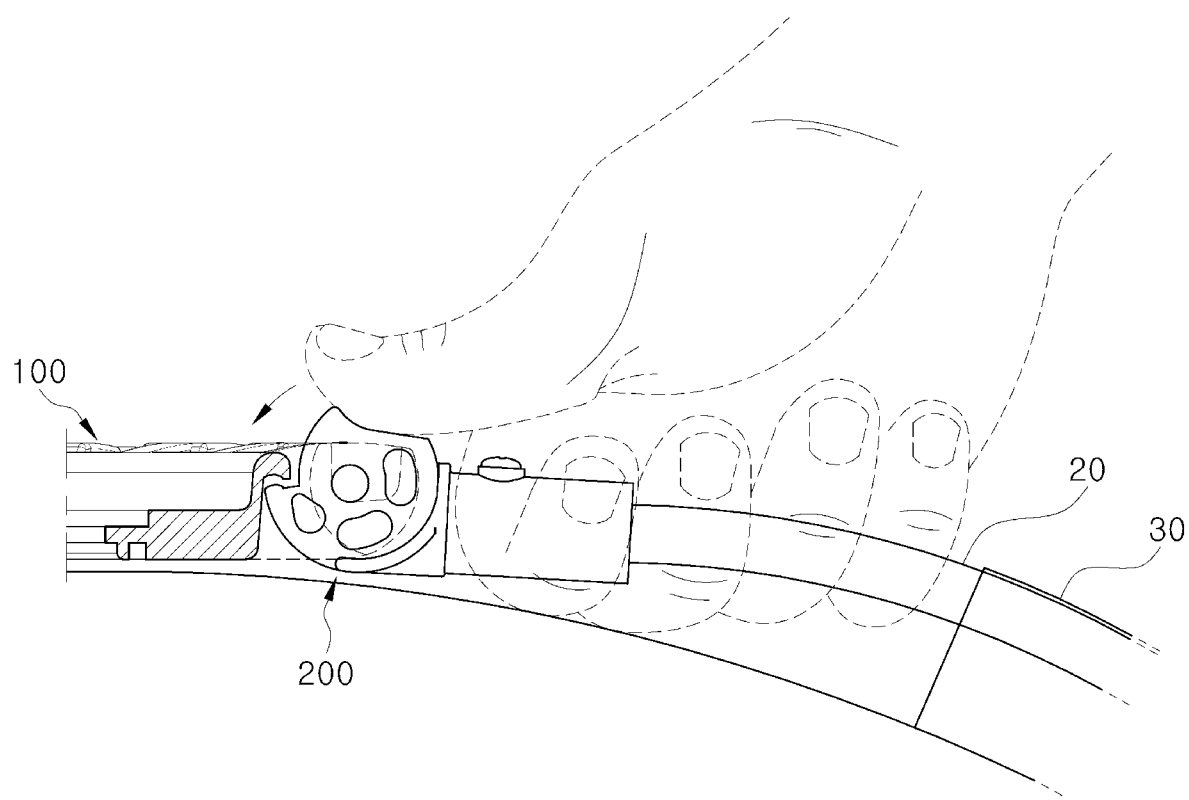
Figure 15:
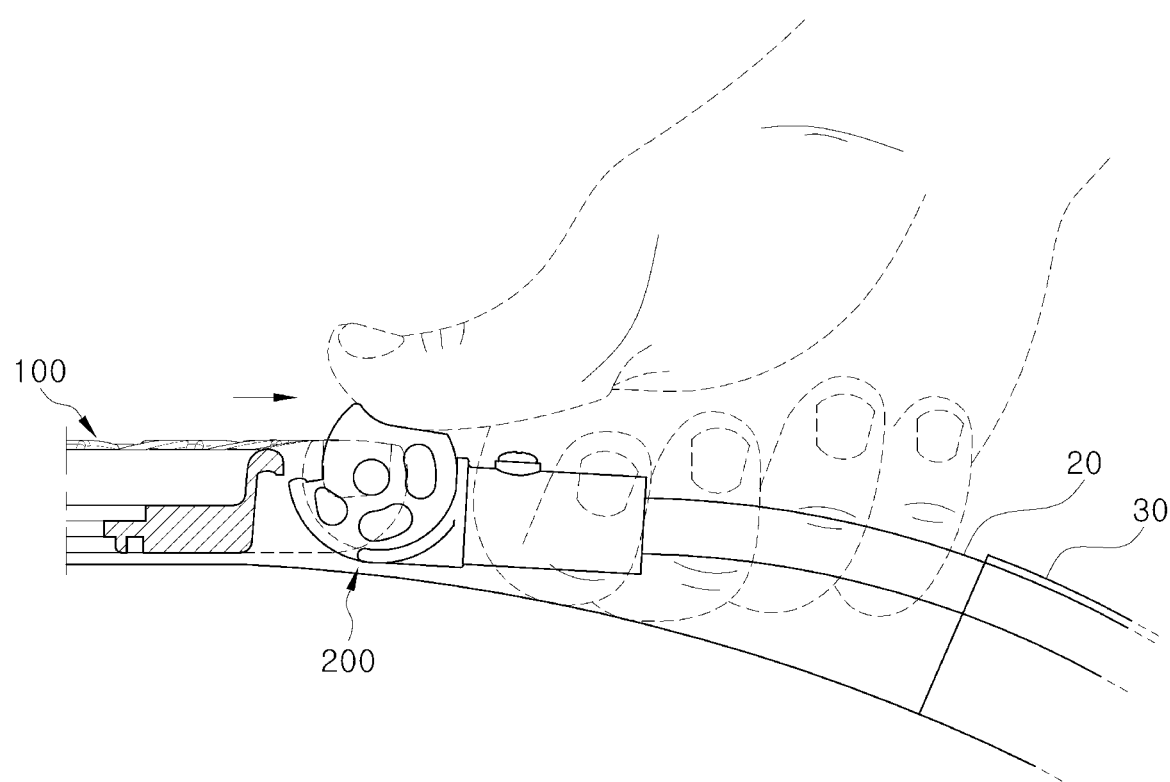

Meanwhile, regarding a method for manipulating the speedring when folding the softbox, the locking is released by pivoting the adaptor 200 counterclockwise as illustrated in FIG. 14, and the first rotational shaft 212 and the second rotational shaft 214 are moved to the right side of the rotational shaft seating groove 132 as illustrated in FIG. 15.

Figure 16:
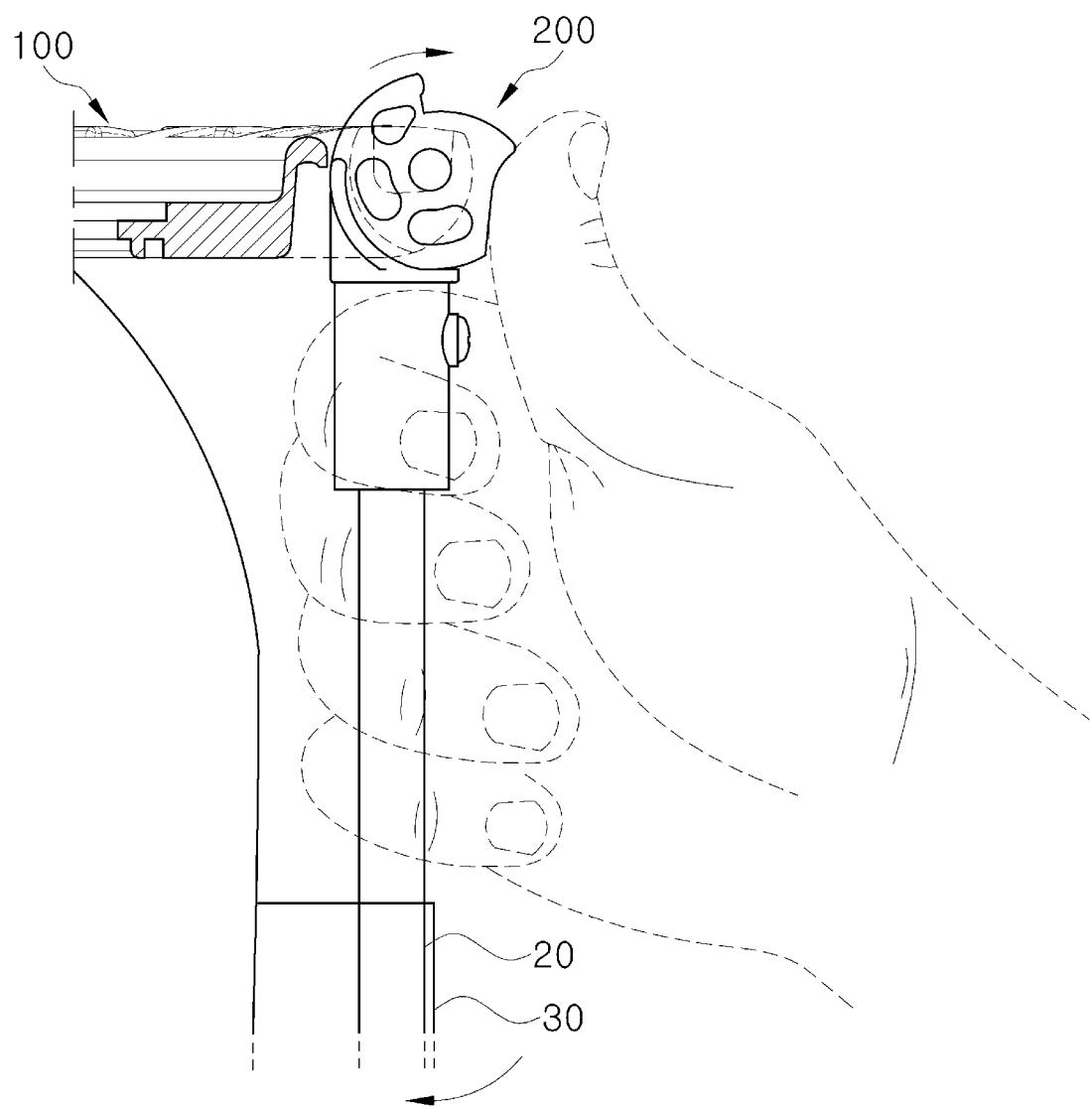

Then, as illustrated in FIG. 16, the user presses the adaptor 200 while pivoting the adaptor 200 clockwise such that the interior angle between the adaptor 200 and the speedring body 100 becomes 90°.

Meanwhile, the inventive concept provides a softbox using the speedring 10 described above.

Figure 17:
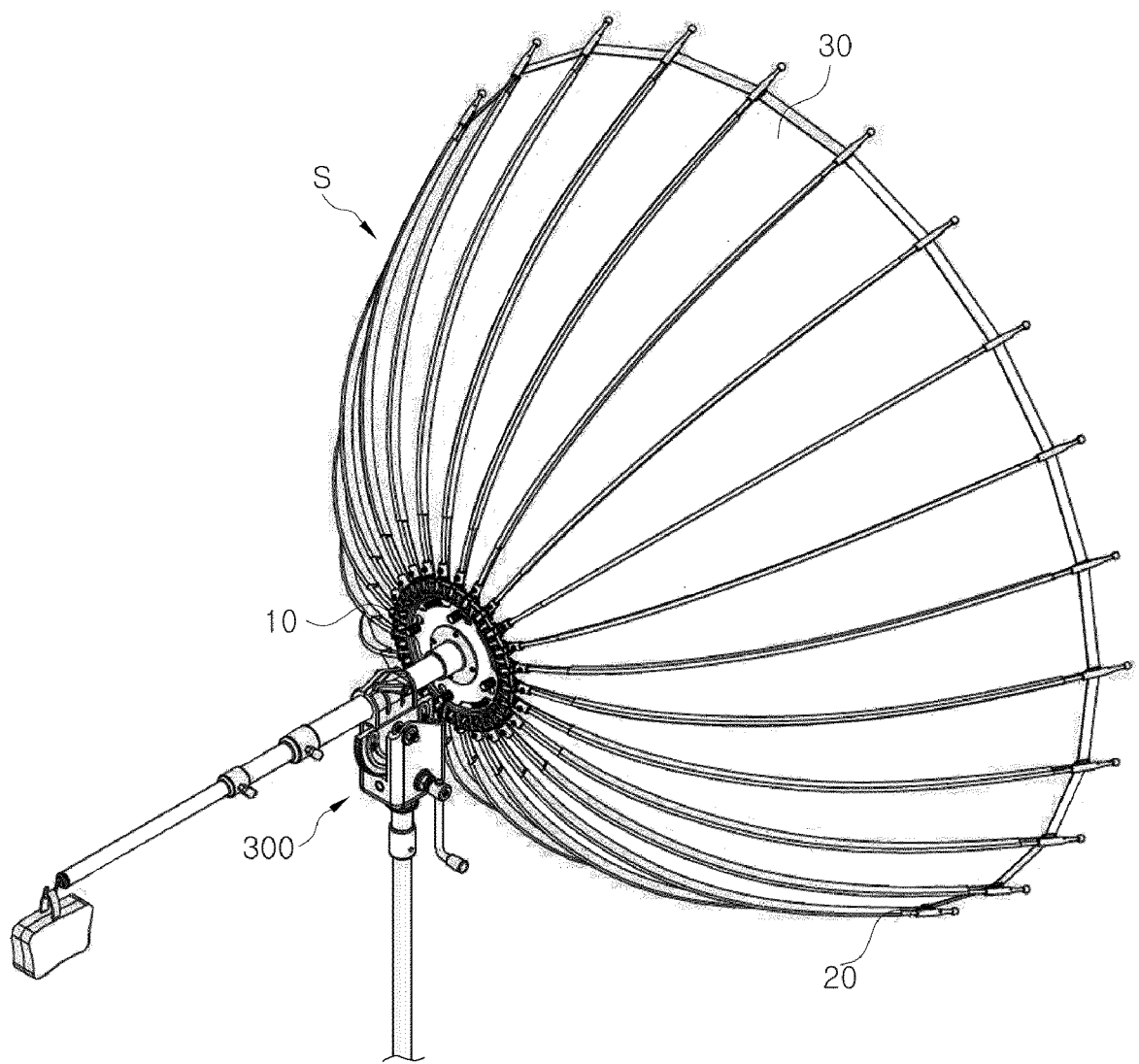
FIGS. 17 and 18 are perspective views illustrating a softbox mounted on a boom stand, according to the inventive concept.
Figure 18:
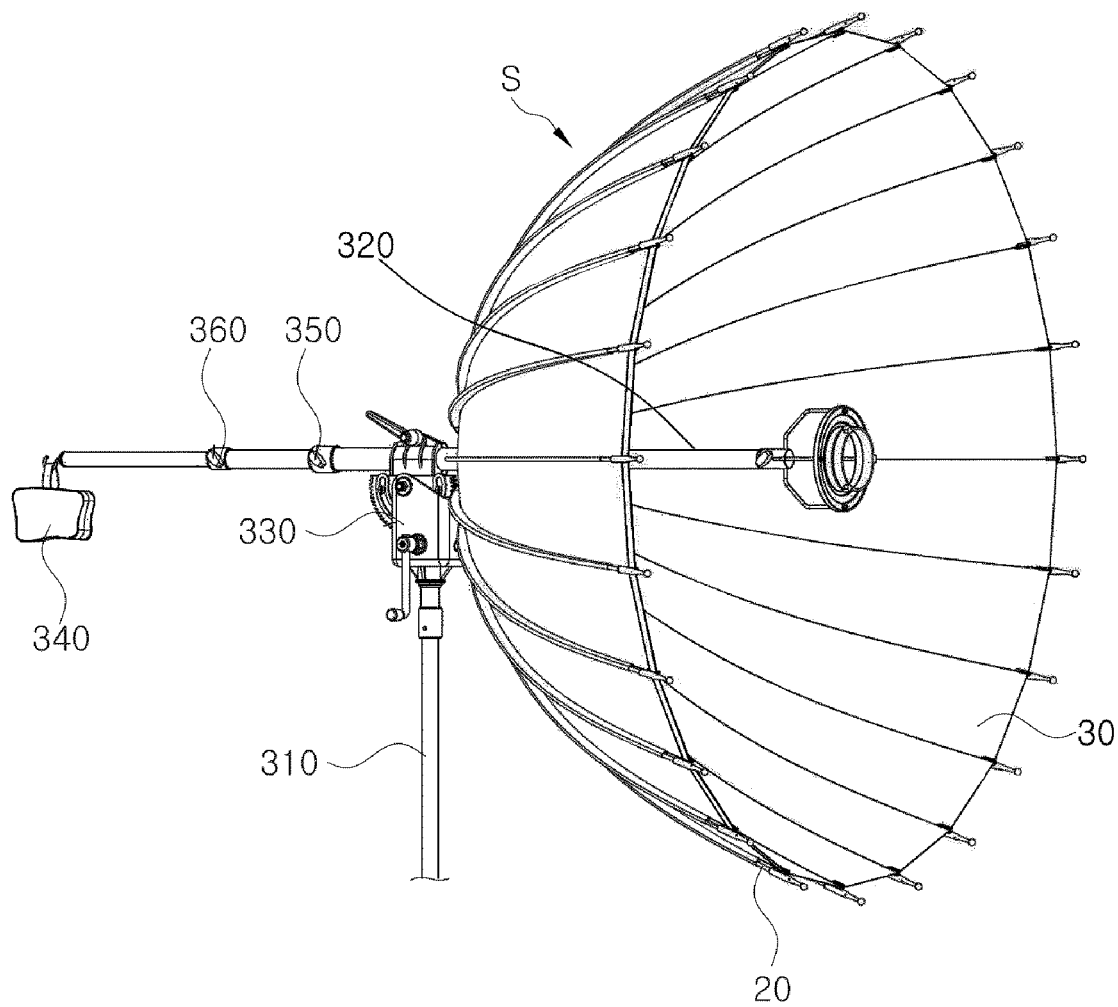

FIGS. 17 and 18 are perspective views illustrating a softbox mounted on a boom stand, according to the inventive concept.

Referring to FIGS. 17 and 18, according to the inventive concept, a softbox 'S' includes a speedring 10, a pole 20, and reflective cloth 30.

According to the inventive concept, the speedring 10 constituting the softbox 'S' includes a speedring body 100, which has a central hole 110 formed at the center thereof to allow light to pass through the central hole 110, a plurality of adaptor inserting holes 120 formed along an outer circumferential surface of the speedring body 100, and rotational shaft seating grooves 132 formed in opposite perpendicular surfaces of each adaptor inserting hole 120, and an adaptor 200, which has a head part 210 including rotational shafts protruding from opposite perpendicular surfaces thereof to be fitted into and assembled with the rotational shaft seating grooves 132 and a body part 220 provided at a lower portion of the head part 210 and including a pole inserting part 222 in formed at a lower end thereof.

According to the inventive concept, the pole 20 constituting the softbox 'S' has one end inserted into the pole inserting part 222 of the speedring 10 to link to the pivoting of the adaptor 200. The pole 20 includes various materials as long as the materials have stiffness and elasticity.

A plurality of poles 20 are mounted depending on the size and the shape of the softbox 'S' required.

The pole 20 is inserted into an inner inserting part of the reflective cloth 30 to generate elastic force outward from the reflective cloth 20 such that the reflective cloth 20 is maintained tightly spread. Accordingly, a diffusion surface, which is at a front surface of the reflective cloth 30, and a reflective surface, which is at a perpendicular surface of the reflective cloth 30, may maintain the maximum smoothness.

Accordingly, the maximum diffusion effect of lighting may be produced by the softbox 'S'.

According to the inventive concept, the reflective cloth 30 constituting the softbox 'S' is coupled to the pole 20 and the speedring 10 to reflect light to be maintained spread and folded depending on the positions of the pole 20 with respect to the speedring 10.

In more detail, the reflective cloth 30 may include a reflective material to reflect light emitted from a light emitting lamp, and fabric attached along an edge of the reflective material on an outer vertical surface of the reflective material.

The reflective material may be formed of silver foil, aluminum foil, or the like capable of reflecting light.

The fabric may be attached to the reflective material through sewing along the edge of the reflective material so as to protect the reflective material from external shock and to improve the durability of the reflective cloth 30.

Meanwhile, the boom stand 300 includes a stand 310 seated on the ground surface, a boom rod 320 mounted at an upper portion of the stand 310, a pivoting clamp 330 interposed between the stand 310 and the boom rod 320 to adjust a vertical angle of the boom rod 320, a counterweight 340 mounted on a rear end of the boom rod 320 to support the weight of a lighting unit mounted on a front end of the boom rod 320, and a first hand bolt 350 and a second hand bolt 360 mounted on the boom rod 320 to adjust and fix the length of the boom rod 320. In this case, the first hand bolt 350 adjusts the length of the front end of the boom rod 302 to adjust the position of the lighting unit, and the second hand bolt 360 adjusts the length of the rear end of the boom rod 302 to adjust the position of the counterweight 340

According to the inventive concept, the simple structure may allow anyone of all ages to assemble the softbox speedring, and reduce the manufacturing costs. In addition, the folding and the storage of the softbox are simple, thereby remarkably improving the carrying and the storage of the softbox.

In addition, according to the inventive concept, even if the adaptor of the speedring is broken, the adaptor may be easily separated from the speedring body and replaced with new one. Accordingly, repair may become simpler and maintenance costs may be reduced.

Further, according to the inventive concept, the additional part is not disposed to block light emitted from the light emitting lamp. Accordingly, since the loss in light quantity may be minimized, the deep depth of field may be obtained in photographing. Accordingly, clear and high-quality lighting may be provided.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A softbox speedring having a fitting assembly structure for a photograph or an image, the speedring comprising:
    a speedring body including
        a central hole formed at a center of the speedring body,
        a plurality of adaptor inserting holes positioned along an outer circumferential surface of the speedring body, and
        a plurality of adaptor mounting members positioned along the outer circumferential surface of the speedring body,
    wherein each adaptor mounting member of the plurality of adaptor mounting members has a disk structure and includes a groove, which is positioned on a center of the disk structure, and a port, which is positioned on an upper portion of the disk structure and configured to be opened to communicate with the groove; and
    an adaptor including
        a head part including
            a first rotational shaft, which is protruding from one side surface of the head part and configured to be fitted into and assembled with one groove of a plurality of grooves of the plurality of adaptor mounting members, and
            a second rotational shaft, which is protruding from the other side surface of the head part and configured to be fitted into and assembled with another groove of the plurality of grooves of the plurality of adaptor mounting members,
        a body part provided at a lower portion of the head part and including a pole inserting part formed in a lower end of the body part; and
        a locking plate protruding along an edge of the head part to prevent the adaptor from deviating from an upper portion of the speedring body.

2. The softbox speedring of claim 1, wherein the locking plate has a cut-out structure having a range of ⅓ to ⅕ of a circumference formed about each of the first and second rotational shafts, and
    wherein the circumference has an inner diameter corresponding to the outer diameter of the each adaptor mounting member.

3. A softbox speedring having a fitting assembly structure for a photograph or an image, the speedring comprising:
    a speedring body including
        a central hole formed at a center of the speedring body,
        a plurality of adaptor inserting holes positioned along an outer circumferential surface of the speedring body,
        a plurality of side surfaces positioned along the outer circumferential surface of the speedring body, and
        a plurality of grooves each of which is positioned on a respective side surface of the plurality of side surfaces; and
    an adaptor including
        a head part including
            a first rotational shaft, which is protruding from one side surface of the head part and configured to be fitted into and assembled with one groove of the plurality of grooves, and
            a second rotational shaft, which is protruding from the other side surface of the head part and configured to be fitted into and assembled with another groove of the plurality of grooves, and
        a body part provided at a lower portion of the head part and including a pole inserting part formed in a lower end of the body part;
    a spread supporting member positioned along the outer circumferential surface of the speedring body,
    wherein the adaptor further includes a locking step provided at an upper portion of the head part, and
    wherein each of the plurality of grooves is formed to have a width allowing the locking step to selectively make contact with the spread supporting member, as a respective rotational shaft moves inside the groove.

4. The softbox speedring of claim 3, wherein the spread supporting member has a spread maintaining groove formed at a lower portion of the spread supporting member, and wherein the locking step includes an inserting protrusion that is provided on a surface, which faces the spread maintaining groove, and inserted into the spread maintaining groove to restrict the adaptor assembled with the speedring body from moving in a front-rear direction.

5. A softbox comprising:

a speedring including:
- a speedring body including
  - a central hole formed at a center of the speedring body,
  - a plurality of adaptor inserting holes positioned along an outer circumferential surface of the speedring body,
  - a plurality of side surfaces positioned along the outer circumferential surface of the speedring body, and
  - a plurality of grooves each of which is positioned on a respective side surface of the plurality of side surfaces; and
- an adaptor including
  - a head part including
    - a first rotational shaft, which is protruding from one side surface of the head part and configured to be fitted into and assembled with one groove of the plurality of grooves,
    - a second rotational shaft, which is protruding from the other side surface of the head part and configured to be fitted into and assembled with another groove of the plurality of grooves, and
  - a body part provided at a lower portion of the head part and including a pole inserting part formed in a lower end of the body part;

a pole having one end inserted into the pole inserting part to link to pivoting of the adaptor; and a reflective cloth coupled to the pole and the speedring to reflect light, wherein the speedring further includes a spread supporting member positioned along the outer circumferential surface of the speedring body, wherein the adaptor further includes a locking step provided at an upper portion of the head part, and wherein each of the plurality of grooves is formed to have a width allowing the locking step to selectively make contact with the spread supporting member, as a respective rotational shaft moves inside the groove.

* * * * *